Figure 1:
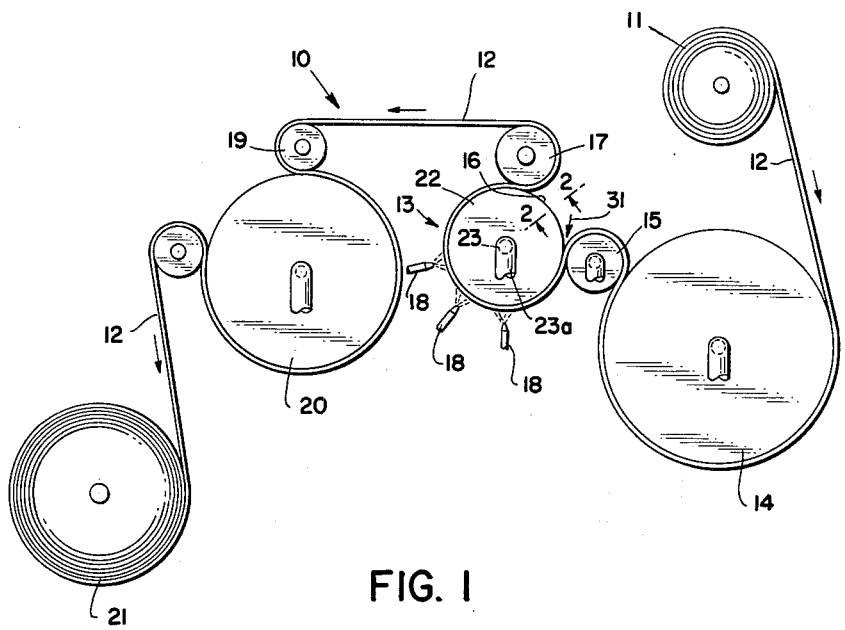

Sept. 7, 1965        G. GILBERT        3,205,112

METHOD OF MAKING EMBOSSING APPARATUS

Original Filed July 18, 1958

United States Patent Office 3,205,112
Patented Sept. 7, 1965

3,205,112
METHOD OF MAKING EMBOSSING APPARATUS
Geoffrey Gilbert, Preakness, N.J., assignor to Chavannes Industrial Synthetics, Inc., Haledon, N.J., a corporation of Delaware
Original application July 18, 1958, Ser. No. 749,508, now Patent No. 3,072,961, dated Jan. 15, 1963. Divided and this application Apr. 13, 1962, Ser. No. 195,356
4 Claims. (Cl. 156—252)

This invention relates to the embossing of sheet material and more particularly to the formation by means of suction of clear, well defined, three dimensional patterns in thermoplastic material.

The present application is a division of application Serial No. 749,508 filed July 18, 1958, for "Embossing Apparatus and Method of Making the Same," now U.S. Patent No. 3,072,961.

In my copending application Ser. No. 479,696, filed jointly with W. L. Prendergast on January 4, 1955, and assigned to the assignee of the present application, granted as U.S. Patent No. 2,905,969, and of which the present application is a continuation-in-part, there is set forth and claimed a class of apparatus in connection with which my present invention is especially useful. Such apparatus is also set forth in U.S. Patents No. 2,776,451 and No. 2,776,452 and Reissue Patent No. 23,910. As there more fully disclosed, a hot, soft plastic film is forced against the porous or pervious embossing means of a continuously moving embossing member by means of suction. The film is forced by suction to conform to the surface indentations and ridges on the embossing surface and is then cooled so as to set and retain the thus formed three dimensional embossing. An important reason for the substantial commercial success of such apparatus resides in the high speed at which excellent embossings of even intricate patterns with considerable detail may be reproduced.

A significant item in the cost of operation of suction embossing apparatus having the design formed in its porous surface as ridges and valleys resides in the relatively short, trouble-free useful life of the embossing surface. In practice, the material forming the embossing surface is supported on a more or less rigid porous surface having openings or perforations formed therethrough. In the case of the rotary type of apparatus a fabric embossing surface forming material may be affixed to the outer surface of a cylindrical drum the interior of which is subjected to subatmospheric pressure while the plastic film is continuously brought into contact therewith and then removed after traveling through an arc partially about the drum.

In practice it has been found that the relatively short life of the usual type of porous material forming the embossing surface results from several major causes. The effect of the pressure differential results in airborne particles, dust and also any powder which may be on the material being embossed, being drawn into the interstices of the material forming the embossing surface where they accumulate to block the pores of the material. This results in an undesirable reduction in the porosity of the embossing material to the atmosphere. Because the fabric extends over the apertures in its supporting member through which it is subjected to the embossing suction, they, too, are blocked and operations must be discontinued in order that the embossing surface may be replaced.

When the fabric forming the embossing material is relatively thick, air leakage through the fabric, particularly at the line where the plastic material initially engages the embossing surface, becomes aggravated with a resultant drop in the pressure differential across the plastic at the very point where the suction to be fully effective should be at the required level to obtain the desired detail and definition in the embossing. It may be noted that an arrangement for minimizing the effects of such leakage is set forth in said copending patent application.

Various treatments have been used on such embossing surface materials as knitted or woven fabrics to better suit them to provide the desired embossing. Such treatments have stiffened the fabric material without modifying its porosity to any appreciable extent. The treatments with which I am familiar have left much to be desired even though the treated fabrics were substantially improved over untreated fabrics. The treated fabrics tended to become excessively brittle and readily damaged. This is especially true of such fabrics as soft boucles, friezes and some laces. Furthermore, such treatments did not prevent the fabric from becoming overloaded with dust or other particles nor did they eliminate the aforementioned leakage of air.

A further drawback which seriously curtailed the usefulness of fabric forming the embossing surface occurred when plastic film containing a plasticizer was being processed. For example, when polyvinyl chloride film is heated to its embossing temperature, some of its plasticizer is driven off and in time saturates the fabric forming the embossing surface. When the fabric thus becomes saturated with this plasticizer material, it becomes soft and bogs down. That is to say, the three dimensional surface effect of the fabric becomes flattened out.

The advantages of my present invention reside in the fact that all of the foregoing drawbacks are avoided and an improved impossing material at little or no extra cost is provided which makes possible an embossing device having a greatly enhanced trouble-free life even when utilized in the processing of plastic films which contain relatively volatile plasticizers.

The foregoing advantages as well as other objects of the present invention are achieved by treating the material which is to form the embossing surface having a three dimensional design so as to render the same completely impervious to the atmosphere. Holes are formed through the treated material so as to render it pervious, the holes being formed at more or less regularly spaced intervals over the entire extent of the material which is to form the embossing surface. Such a material being impervious, apart from the holes formed therethrough, provides no leakage paths and cannot collect dust or other particles. Preferably the embossing surface material is impregnated with a composition having good resistance to heat and to solvents, particularly to polyvinyl plasticizers. This impregnating agent should be film forming and should permeate the material without leaving a surface residue. The adhesive used to cement the impregnated material to its support should also have good resistance to heat and solvents.

As will be fore fully pointed out the preferred method in accordance with the present invention greatly increases the hardness of the material forming the embossing surface as well as its strength but does not render the material brittle. As a result of my treatment, the material, rather than becoming embrittled, is and retains a high degree of flexibility.

Figure 2:
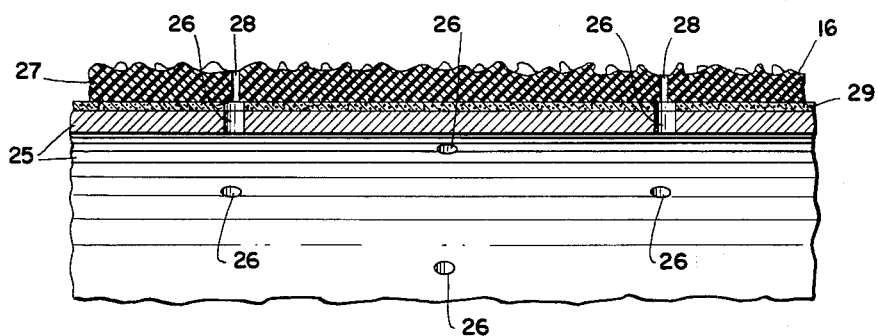

Further objects as well as advantages of the present invention will be apparent from the following description and the accompanying drawings in which FIGURE 1 is a diagrammatic view of one form of an embossing apparatus incorporating the present invention; and FIGURE 2 is a cross sectional view along the line 2—2 of FIGURE 1.

Apparatus 10 is representative of a well known type of apparatus for embossing plastic film and, as shown diagrammatically in FIGURE 1, comprises a supply spool 11 from which a web of plastic film 12 is drawn and fed to an embossing drum 13. Means are provided between spool 11 and embossing drum 13 for bringing the plastic film 12 to embossing temperature. For this purpose, heating rollers 14 and 15 are indicated in FIGURE 1 about which the plastic film 12 passes on its way to the embossing drum 13. A subatmospheric pressure is maintained within the interior of embossing drum 13 and communicates with the atmosphere through its porous or pervious embossing surface 16 except where the surface 16 is covered by the plastic film 12. Here, the pressure differential created due to the subatmospheric pressure within the interior of embossing drum 13 results in the plastic film being urged tightly against the embossing surface 16. The film 12 passes about drum 13 through the extended arc between heating roller 15 and a stripper roller 17. The actual embossing of the hot soft film takes place in the first few inches of its travel about the embossing drum 13. The film 12 is then cooled in any convenient manner. For example, cold water may be sprayed upon the exterior surface of film 12 as indicated by nozzles 18 which are connected to a source of cold water (not shown). The cooled film, which is now well below its embossing temperature, is withdrawn from embossing drum 13 and passes about stripper 17, idler 19 to a cooling drum 20. The film 12, when it arrives at take-up spool 21, is sufficiently dry and cool to be wound in roll form.

The apparatus 10 may also include other appurtenances as are well known but need not be described in detail here because they do not form a part of the present invention. However, it may be well to note that means may be provided to stretch the plastic film 12 while it is travelling to the embossing drum 13. Also where, as in the present instance, the embossed film is cooled by spraying a liquid coolant directly upon it, stripper 17 may also have a porous surface and a subatmospheric pressure within its interior of somewhat less of a vacuum than that maintained within the interior of embossing drum 13. Thus the stripper 17 not only facilitates removal of the film from drum 13 but also functions to remove excess moisture. Additional drying apparatus may also be provided along the course followed by the film from stripper 17.

Embossing drum 13 may be constructed generally as set forth in detail in said copending application. That is to say, drum 13 comprises a pair of annular end-plates 22, one of which is shown in FIGURE 1, mounted on a tubular shaft 23 at least one end of which is connected to a suitable vacuum pump by a pipe 23a. A cylindrical sleeve or shell 25 is removably sealed in airtight relation to end-plates 22 and has holes or perforations 26 formed therethrough so that it is pervious to the atmosphere. Shaft 23, intermediate end-plates 22, has perforations formed therethrough through which the interior of shell 25 communicates with the vacuum pump.

The exterior surface of shell 25 is covered throughout 360° and substantially from end to end with an impregnated material 27 which is pervious or permeable to the atmosphere because of a plurality of relatively small holes 28 formed therethrough, each of which is in registration with one of the perforations 26 formed through shell 25. The material 27 is firmly attached to the exterior surface of shell 25 by adhesive as indicated at 29. It is the surface 16 of material 27 which forms the embossing surface having a three dimensional design formed thereon against which plastic film 12 is intimately forced by reason of the subatmospheric pressure maintained within the interior of shell 25.

When prepared in accordance with the present invention, as will be more fully pointed out hereinafter, material 27 is hard but relatively strong and flexible as compared to materials heretofore in use.

Being impervious to the atmosphere except for holes 28 which register with shell perforations 26, the material is not subject to becoming loaded with dust or other particles. Such particles as may be drawn into holes 28 by reason of the suction therethrough are carried into shell 25 where they are readily dealt with if they are not carried on through shaft 23 and out of the system. Also because of the impervious nature of the impregnated material 27, there is no possibility of air leaking circumferentially through material 27 in the general direction indicated by arrow 31 in FIGURE 1.

I have found that in general it is not necessary for holes 28 to be more closely spaced than 1 to 1½ inches to provide faithful reproduction of the three dimensional surface contours of material 27 even when it has an intricate design formed thereon. Preferably, the diameter of holes 28 ranges from about 0.020 to 0.050 inch depending upon the nature of the starting material used to form the impregnated material 27. When relatively rough fabrics such as carpeting, imitation fur, coarse friezes and boucles are utilized then the larger diameter holes may be formed. On the other hand when smoother materials are utilized the diameter of holes 28 is preferably less than 0.030 inch because less air is required to be withdrawn from between the film and the surface 16 after the film contacts the surface and before it bottoms or comes into intimate contact with the surface. Perforations 26 have a diameter such that they may receive the pins utilized to form the largest holes 28 which may be desired in material 27. Because of the impervious nature of material 27, holes 26 may be somewhat larger than holes 28, the latter then controlling, rather than holes 26, the flow of air into the interior of drum 22.

To obtain a material having the desired properties the impregnating material utilized should have excellent heat and solvent resistance and in particular should be resistant to polyvinyl plasticizers. It should readily soak or wet the material being impregnated and should leave no surface deposit which may form a gloss and thereby interfere with the embossing operation. Furthermore, the impregnating material should be of a type which is film-forming such as is characteristic of an adhesive whereby to render the impregnated material impervious. This film formed by the impregnating material must close and seal the openings normally present in the embossing material by bridging the spaces between threads or fibers or other hole or pore defining surfaces. In other words, the impregnating material should thoroughly permeate and seal the material 27 but should not leave any surface residue.

An epoxy resin mixed with a synthetic rubber may form the impregnating agent. Other agents having a suitable resistance to heat and solvents may be used, such as the phenol-aldehyde resins, including phenol-formaldehyde or phenol-furfuraldehyde resins, etc.; resorcinol resins such as resorcinol formaldehyde resins, etc.; polyurethane, polyester and phenol-epoxy resins.

The adhesive also should have excellent heat and solvent resistance and in addition should make a strong durable bond with the material forming shell 25. Epoxy resin mixed with synthetic rubber has the required heat and solvent resistance and also makes an excellent bond with the stainless steel with which shell 25 is fabricated. Other materials which provide the desired bond with metal are polyurethane and phenol-epoxy resins.

The embossing material may be treated with the impregnating agent before or after it has been attached to shell 25. With materials which require stretching in order to obtain the desired effect, such as in the case of very loosely woven materials, it is preferable to stretch the material and treat it with the impregnating agent before it is is attached to the shell.

As a first example, the present method will now be described in connection with the application of an upholstery type of fabric such as a bouncle, having relatively large slubs along its strands, to the exterior of cylindrical shell 25 made of stainless steel. A length of the material is cut to fit about shell 25 and is cemented to the surface thereof. This may be readily accomplished by painting the surface of the shell with an epoxy resin mixed with synthetic rubber. A suitable adhesive is sold by Rubber and Asbestos Corporation, Bloomfield, New Jersey, under the designation Bond Master B–344. This is epichlorhydrin and bisphenol mixed with a rubbery copolymer of butadiene. The material is wrapped around the shell which has been painted with the adhesive and its ends are brought together in a butt joint so that the joint does not appear in the subsequent embossings. The shell 25 with material 27 thus affixed thereto is then permitted to stand at room temperature for about 48 hours. Following this the cement is oven cured for one to two hours at about 250° F. and then permitted to cool. The embossing material is now in condition to be treated with the impregnating agent.

The same epoxy resin and synthetic rubber mixture sold commercially under the designation Bond Master B–344, diluted with 1 to 2 parts by volume of methyl, ethyl ketone is used as the impregnating agent. A sufficient amount of the dilutant is added so that the epoxy resin-synthetic rubber mixture flows sufficiently freely into the material being treated. The impregnating agent is preferably painted onto the embossing material while shell 25 is rotated about its axis which is horizontally disposed so as to keep the agent from settling. The impregnating agent is evenly distributed over the embossing material in sufficient quantity to saturate the same while avoiding the application of more agent than the material can hold. As soon as the impregnating agent has soaked into the embossing material, a lamp is illuminated within the interior of shell 25 to facilitate locating perforations 26. Elongated pins having a diameter such as to provide holes through the impregnated fabric of the desired size, in the present instance about 0.05 inch in diameter, are now inserted through the impregnated fabric into each of the holes 26. With the pins in place and extending through the fabric, the shell coated with the impregnated fabric is placed in an oven and heated for one to two hours at about 250° F. When the curing is completed the shell is removed from the oven and the pins are removed from the fabric. The shell with the embossing material thereon is now in the condition illustrated in FIGURE 2 and is ready to be assembled with shaft 23 and end-plates 22 to form an embossing drum suitable for mounting in the apparatus 10.

As a second example of the present method of forming an embossing surface for use in suction embossing apparatus let it be assumed that the embossing material is to be formed from a knit or loosely woven fabric. This type of material is normally stretched before cementing to the shell 25. It is substantially saturated with the impregnating agent, epichlorhydrin and bisphenol mixed with a rubbery copolymer of butadiene and diluted with one to two parts of methyl, ethylketone, either just before or immediately after it has been placed upon a stretcher where it is permitted to partially air dry to a non-tacky state. Again, an excess of the impregnating agent such as would leave a surface residue is avoided. The air drying generally requires about three hours with the aforementioned epoxy resin mixed with synthetic rubber. While the impregnated material is still soft it is removed from the stretcher and applied to the shell 25 which has been previously coated with the adhesive. The interior of the shell is illuminated with a lamp and pins of the desired diameter are inserted through the impregnated fabric into each of the perforations 26. The shell with the impregnated material 27 therearound and the pins in place is now permitted to air cure for 48 hours. Following this it is baked in an oven for 1 to 2 hours at about 250° F.

It is to be understood that while the foregoing examples are illustrative of the preferred method the specific curing temperature and periods apply to the specific materials utilized and variations will be made as required for different materials as is well known. When the starting material utilized to form the impregnated material 27 contains synthetic fabrics which are attacked by methyl, ethyl ketone, tri-chlorethylene or carbon tetrachloride may be utilized to dilute the epoxy resin-synthetic rubber mixture instead of methyl, ethyl ketone.

While I have described my present invention in detail in connection with an embossing material formed of knitted or woven fabrics affixed to a rotating embossing drum it is to be understood that my present invention is not limited to the specific materials or the apparatus described. Any porous, permeable or absorbent material can be used as the starting material to form the impregnated embossing material 27 so long as its surface has or may be provided with the desired three dimensional effect. Because of the strength and hardness given to the treated material, readily deformable materials may be utilized which otherwise would be entirely unsuited for use in providing the three dimensional embossing surface. Furthermore, if desired, the impregnated embossing material of the present invention may be advantageously utilized to form the embossing surface in the type of apparatus shown in U.S. Reissue Patent No. 23,910 or on individual molds of the type shown in U.S. Patent No. 2,354,916. Additionally, certain of the advantages of the persent invention are achieved when the embossing material provided herein is utilized in a single sheet embossing apparatus of the type disclosed in U.S. Patent No. 2,493,439.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. The method of forming an embossing apparatus, comprising affixing an air-pervious embossing material over one side of a support member having spaced perforations formed therethrough, impregnating said material with a thermosetting air-impervious film-forming agent, curing said agent so as to render said material impervious to the atmosphere while maintaining the outer contoured surface of said embossing material substantially unaltered by said agent, and forming holes through said material which communicate with the perforations in said support member so as to provide passageways therethrough for the atmosphere.

2. The method of forming an embossing apparatus, comprising affixing an air-pervious embossing material over one side of a support member having spaced perforations formed therethrough, then impregnating said material while on said support member with a thermosetting air-impervious film-forming agent, then opening holes through said material which communicate with the perforations in said support member so as to provide passageways therethrough for the atmosphere, and then while maintaining said holes open curing said agent so as to render said material substantially impervious to the atmosphere except for said holes while maintaining the outer contoured surface of said embossing material substantially unaltered by said agent.

3. The method of forming an embossing apparatus, comprising affixing an air-pervious embossing material over one side of a support member having spaced perforations formed therethrough, then impregnating said material while on said support member with a thermosetting air-impervious film-forming agent, then opening holes through said material each of which registers with one of the perforations in said support member so as to provide passageways therethrough for the atmosphere, and then while maintaining said holes open curing said agent so as to render said material substantially impervious to the atmosphere except for said holes while maintaining the outer contoured surface of said embossing material substantially unaltered by said agent.

4. The method of forming an embossing apparatus, comprising impregnating an air-pervious embossing material with a thermosetting air-impervious film-forming agent, affixing the impregnated material to one side of a support member having a plurality of spaced perforations formed therethrough, then opening holes through said material each of which registers with one of the perforations in said support member so as to provide passageways therethrough for the atmosphere, and then, while preventing said agent from closing said holes, curing said agent so as to render said material substantially impervious to the atmosphere except for said holes while maintaining the outer contoured surface of said embossing material substantially unaltered by said agent.

References Cited by the Examiner

UNITED STATES PATENTS

| | | | |
|---|---|---|---|
| 1,608,727 | 11/26 | Dickey | 156—253 |
| 1,862,633 | 6/32 | Ramsey | 156—253 |
| 1,988,640 | 1/35 | Welsford | 156—253 X |
| 2,115,543 | 4/38 | Thackray | 156—285 X |
| 2,570,110 | 10/51 | Glatt | 117—4 |

FOREIGN PATENTS 475,756   11/37   Great Britain.

EARL M. BERGERT, *Primary Examiner.*

UNITED STATES PATENT OFFICE
CERTIFICATE OF CORRECTION

Patent No. 3,205,112 September 7, 1965

Geoffrey Gilbert

It is hereby certified that error appears in the above numbered patent requiring correction and that the said Letters Patent should read as corrected below.

Column 1, line 29, for "means" read -- surface --; line 38, after "of", first occurrence, insert -- the --; column 2, line 30, for "impossing" read -- embossing --; line 54, for "fore" read -- more --; column 4, line 72, for "bouncle" read -- boucle --.

Signed and sealed this 5th day of April 1966.

(SEAL)
Attest:

ERNEST W. SWIDER
Attesting Officer

EDWARD J. BRENNER
Commissioner of Patents